United States Patent [19]
Kawamura et al.

[11] 3,935,919
[45] Feb. 3, 1976

[54] AUTOMATIC SEAT BELT LOCKING SYSTEM FOR VEHICLE

[75] Inventors: Takahide Kawamura, Toyota; Muneki Yoshino, Toyokawa; Koichi Taniguchi, Kariya, all of Japan

[73] Assignees: Nippondenso Co., Ltd., Kariya; Toyota Jidosha Kogyo Kabushiki Kaisha, Toyota, both of Japan

[22] Filed: Mar. 26, 1974

[21] Appl. No.: 454,915

[30] Foreign Application Priority Data
Mar. 27, 1973 Japan............................... 48-35291
May 8, 1973 Japan............................... 48-51318

[52] U.S. Cl.......... 180/82 C; 180/103 A; 200/61.47; 280/150 SB; 307/10 SB
[51] Int. Cl.².......................................... B60R 21/10
[58] Field of Search............... 180/82 R, 82 C, 103; 280/150 AB, 150 SB; 200/61.45 R, 61.47; 307/10 SB

[56] References Cited
UNITED STATES PATENTS

| | | | |
|---|---|---|---|
| 3,485,973 | 12/1969 | Kaiser............................ | 180/103 X |
| 3,571,539 | 3/1971 | Kaiser............................ | 200/61.53 |
| 3,622,974 | 11/1971 | Best............................... | 180/103 X |
| 3,750,100 | 7/1973 | Ueda.......................... | 200/61.45 R X |
| 3,765,699 | 10/1973 | Marquardt et al. ......... | 280/150 AB |

*Primary Examiner*—M. Henson Wood, Jr.
*Assistant Examiner*—John P. Silverstrim
*Attorney, Agent, or Firm*—Cushman, Darby & Cushman

[57] ABSTRACT

There is provided an automatic seat belt locking system for a vehicle, e.g., an automobile whereby while in the normal condition the vehicle occupants are not restrained by their seat belts, the seat belts are automatically locked to secure and protect the occupants in the case of an emergency such as a collision. The system comprises a pair of acceleration/deceleration detectors which are composed for example of two different types of mercury switches and which are also adapted to respectively generate a first and second output signal when the acceleration or deceleration of the vehicle exceeds a first and second predetermined value, and absorbing means whereby transient accelerations greater than the first predetermined value and caused by disturbances are absorbed to render both of the detectors inoperative while the vehicle is running on an incomplete, rough road surface.

7 Claims, 11 Drawing Figures

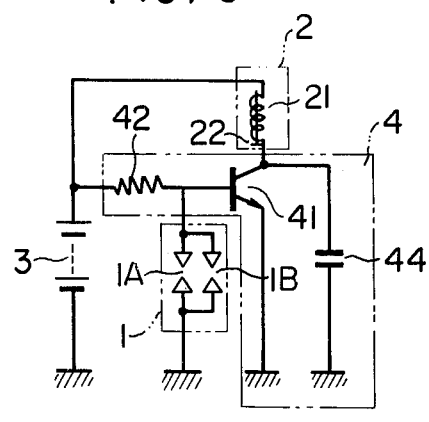
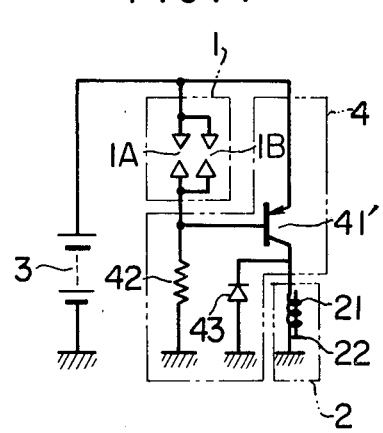
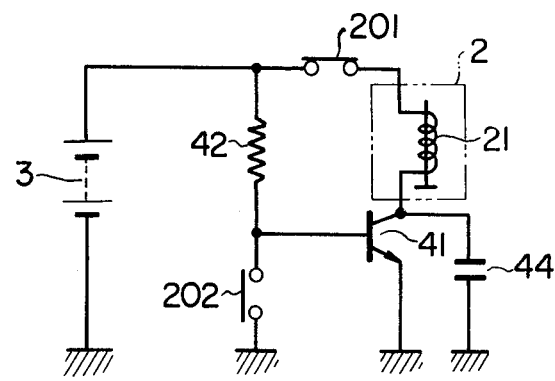

AUTOMATIC SEAT BELT LOCKING SYSTEM FOR VEHICLE

The present invention relates generally to vehicle occupants constraining systems, and more particularly it relates to an automatic seat belt locking system for a vehicle, e.g., an automobile whereby while a vehicle occupant is not restrained by a seat belt in the normal condition, the seat belt is automatically locked in case of sudden necessity, as in a collision or on rapid braking of the vehicle.

FIG. 6 is a wiring diagram showing another embodiment of the system according to this invention;

FIG. 7 is a wiring diagram showing still another embodiment of the system according to this invention;

FIG. 8 is a wiring diagram showing still another embodiment of the system according to this invention;

Figure 9:
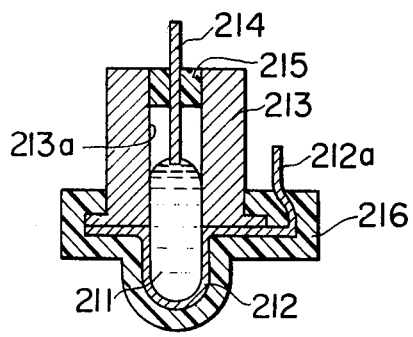
Figure 10:
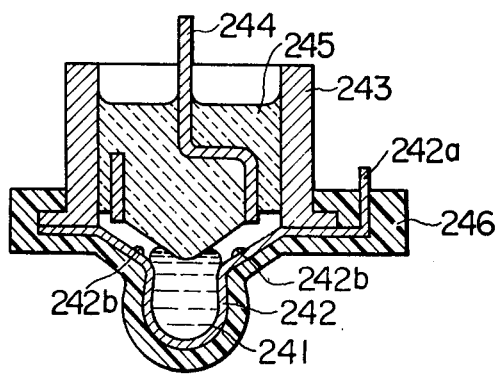
Figure 11:
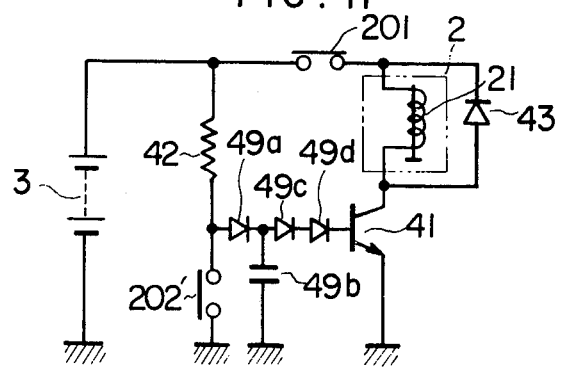

FIGS. 9 and 10 are longitudinal views showing respectively the normally closed acceleration/deceleration detector and the normally open acceleration/deceleration detector in the embodiment of FIG. 8; and FIG. 11 is a wiring diagram showing still another embodiment of the system according to this invention. The same reference numerals designate the same or corresponding parts throughout the drawings.

Figure 1:
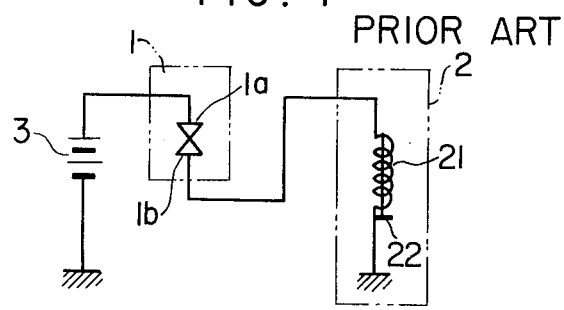
FIG. 1 is a wiring diagram of a prior art automatic seat belt locking system.

Conventional automatic seat belt locking systems for vehicles are generally constructed as shown in FIG. 1 of the accompanying drawings, in which in case of sudden necessity, as when an acceleration or deceleration greater than a predetermined value occurs in a collision of a vehicle or when the vehicle is quickly braked, normally closed type acceleration/deceleration detecting means 1 is opened so that the supply of current from a power source 3 to a seat belt locking mechanism 2 is stopped, whereby a solenoid 21 of the locking mechanism 2 is deenergized and a core 22 is returned to its initial position, thereby locking the seat belt and preventing the free movement of the seat belt to protect the occupant.

Consequently, while, in comparison with other types of systems using normally open type acceleration/deceleration detecting means, there is an advantage that the provision of the normally closed acceleration/deceleration detecting means 1 in the supply circuit from the power source 3 to the locking mechanism 2 enables the system to function as a fail safe system in that the locking mechanism 2 acts in a direction to lock the seat belt whenever there occurs any fault such as a contact fault or poor soldering of the connector in the supply circuit which tends to open the acceleration/deceleration detecting means 1, this must be offset by a disadvantage that when there occurs a fault which tends to keep the normally closed acceleration/deceleration detecting means 1 in the closed position, such as, the burned contacts due to the local heating of the contacts by the opening and closing of the normally closed acceleration/deceleration detecting means 1, in case of sudden necessity the seat belt cannot be locked to protect the vehicle occupant.

Figure 2:
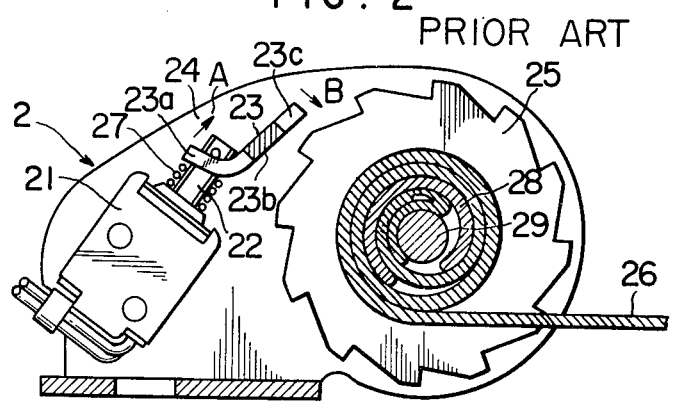
FIGS. 2 and 3 show respectively a cross-sectional view and a plan view of the seat belt locking mechanism in the prior art system of FIG. 1 which is also used in the system of this invention.
Figure 3:
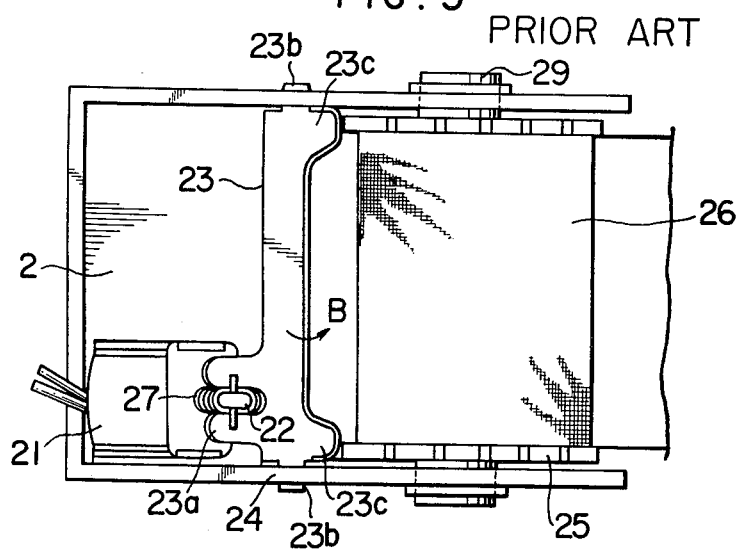

Referring first to FIGS. 1 through 3 showing the general construction of the previously mentioned prior art system, in the normal condition the locking solenoid 21 of the seat belt locking mechanism 2 is normally energized, since the acceleration/deceleration detecting means 1 has its contacts 1a and 1b normally closed. Consequently, the solenoid 21 attracts the core 22 thus holding a ratchet plate 23 in the position shown in FIG. 2. In this condition, end edges 23c of the ratchet plate 23 are out of engagement with a ratchet wheel 25 and a seat belt 26 can be pulled out freely. On the other hand, when an acceleration or deceleration greater than a predetermined value occurs in case of an emergency of the vehicle, the contacts 1a and 1b of the acceleration/deceleration detecting means 1 are opened and the locking solenoid 21 of the seat belt locking mechanism 2 is deenergized causing the core 22 to be returned in the direction of an arrow A by the spring force of a coiled return spring 27. In this case, since the ratchet plate 23 is rotatably mounted in the mounting holes of a body portion 24 through its intermediate portion 23b, the movement of the core 22 in the direction of the arrow A causes the ratchet plate 23 to rotate about the intermediate portion 23b, so that the end edges 23c are moved in the direction of an arrow B into engagement with the teeth of the ratchet wheel 25 to prevent its rotation in the counterclockwise direction. This prevents further drawing movement of the seat belt 26 and protects the vehicle occupant.

With a view to overcoming the foregoing difficulty, it is an object of the present invention to provide an automatic seat belt locking system for a vehicle, in which there are provided acceleration/deceleration detecting means for controlling the operation of a seat belt locking mechanism in response to acceleration or deceleration exceeding first and second predetermined detection values, whereby the seat belt is quickly locked to protect the occupant in the case of a collision of the vehicle, while the seat belt is positively locked upon quick braking of the vehicle, and moreover the detectors exhibit insensitive characteristics against accelerations and decelerations due to the irregularities in a road surface to thereby prevent any undesired seat belt locking operations.

It is another object of the present invention to provide a fail safe type automatic seat belt locking system for a vehicle wherein the switching signals due to the on and off of acceleration/deceleration detecting means comprising a pair of parallel connected normally open mercury switches or acceleration/deceleration detectors, are inverted and supplied to a seat belt locking mechanism through a switching circuit, whereby in case of sudden necessity the supply of power to the seat belt locking mechanism is cut off to effect the locking of the seat belt, thereby enabling the system to operate on a safe side (in a direction which locks the seat belt) when there occurs an electric fault such as the breaking of a locking solenoid.

It is still another object of the present invention to provide such automatic seat belt locking system for a vehicle wherein the reliability of operation of acceleration/deceleration detecting means is improved by use of two mercury switches or acceleration/deceleration detectors in parallel arrangement.

It is still another object of the present invention to provide such automatic seat belt locking system for vehicles wherein when at least one of a normally open acceleration/deceleration detector and a normally closed acceleration/deceleration detector detects an acceleration or deceleration of the vehicle reaching a predetermined value, the seat belt is locked to protect the occupant, and moreover the system serves as a fail safe type which operates on a safe side when any of various electric faults occur in the circuitry, thereby highly improving the reliability of operation of the system.

The system according to this invention has among its remarkable advantages the fact that since it comprises a pair of acceleration/deceleration detectors composed of mercury switches and adapted to respectively generate a first and second output signal when an acceleration or deceleration of a vehicle exceeds a first and second predetermined value, respectively, and absorbing means for rendering the acceleration/deceleration detectors insensitive against transient accelerations and decelerations caused when the vehicle is running on a rough road surface, it is possible to eliminate such troubles as deteriorated durability, generation of intermittent operating sounds and operating troubles which will otherwise be caused when the vehicle is running on a rough road surface.

Another remarkable advantage of the system of this invention is that if any one of the acceleration/deceleration detectors becomes faulty by any chance, the seat belt can still be locked by the other acceleration/deceleration detector, thus enabling the system to serve as a fail safe type system which operates with a high degree of reliability.

Figure 4:
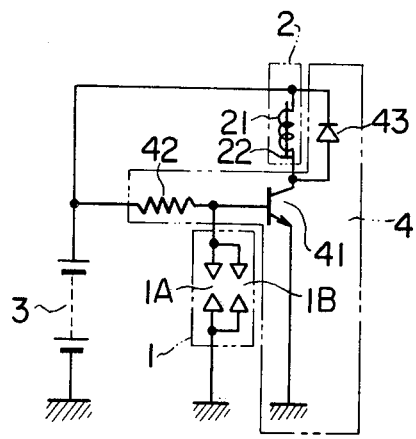
FIG. 4 is a wiring diagram showing an embodiment of an automatic seat belt locking system according to this invention.

Referring now to FIG. 4, there is illustrated a circuit diagram for an embodiment of the system of this invention. In FIG. 4, numeral 1 designates acceleration/deceleration detecting means comprising a pair of normally open mercury switches or acceleration/deceleration detectors 1A and 1B connected in parallel arrangement and so constructed that the detector 1B generates a first detection signal when an acceleration or deceleration exceeds a first predetermined value and the detector 1A generates a second detection signal when the acceleration or deceleration exceeds a second predetermined value. The acceleration/deceleration detecting means 1 is mounted on the vehicle body at a suitable position such as on the bumper. The acceleration/deceleration detecting means 1 is not limited to a mercury switch. It is possible to use any other switch means for detecting the acceleration/deceleration. However, the description of the following embodiments will be made by exemplifying the mercury switch as the acceleration/deceleration detecting means 1. Numeral 2 designates a seat belt locking mechanism, 21 a locking solenoid, 22 a core. The seat belt locking mechanism 2 of this embodiment may be of the same construction as that of the previously described prior art system shown in FIGS. 2 and 3 and therefore its detailed construction will not be described. Numeral 3 designates a power source comprising a battery installed in the vehicle, 4 a switching circuit by which the switching signals due to the on and off of the acceleration/deceleration detecting means 1 are inverted and which comprises a switching means, i.e., a transistor 41, a transistor base resistor 42 and a diode 43 for absorbing the counter electromotive force induced in the locking solenoid 21.

Figure 5:
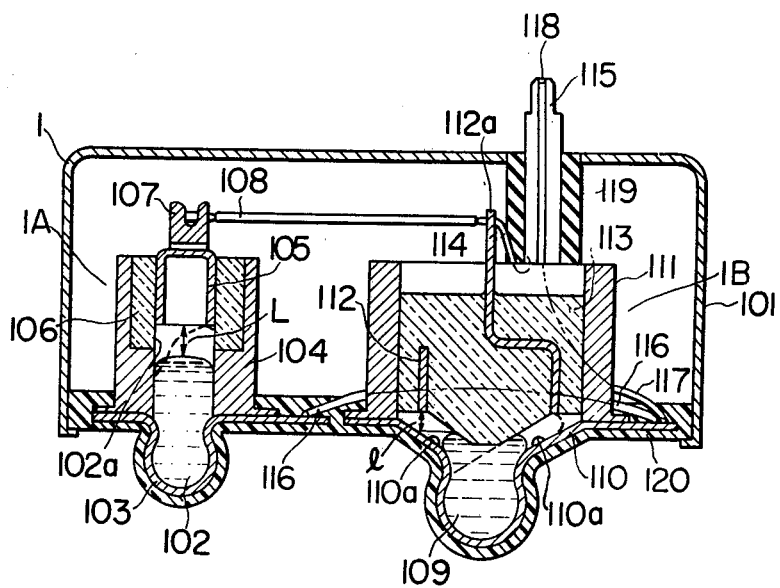
FIG. 5 is a longitudinal sectional view of the acceleration/deceleration detecting means used in the embodiment of FIG. 4.

In FIG. 5, there is illustrated in detail the construction of the acceleration/deceleration detecting means 1 wherein the normally open mercury switches or acceleration/deceleration detectors 1A and 1B are housed in a case 101 made from a metallic plate, i.e., steel plate. The mercury switch or acceleration/deceleration detector 1A will be described first, in which numeral 102 designates mercury, 103 a container made from a metallic material, e.g., a steel plate, 104 a cylindrical member made from steel and normally in contact with the mercury 102. Numeral 105 designates a cylindrical electrode made for example from iron-nickel alloy and positioned opposite to the surface of the mercury 102 with some intervening gap L therebetween. Numeral 106 designates a sealing member composed of glass for hermetically sealing the mercury 102, 107 a terminal secured to the electrode 105, 108 a lead wire connected to the other end of the terminal 107. The mercury switch 1A has the electrode 105 and the mercury 102 normally electrically disconnected from each other thus constituting a normally open type switch. A flow surface 102a for the mercury 102 in the mercury switch 1A stands substantially vertical to the surface of the mercury 102. The distance of the gap L in the normally open mercury switch 1A is selected greater than that in the mercury switch 1B that will be described later, so that it detects only such a second predetermined value of a large acceleration or deceleration as will occur in case of a collision, e.g., accelerations or decelerations greater than 2.5 G (G is the acceleration by gravity). Further, a flow surface 102a for the mercury 102 in the mercury switch 1A is made into a flat and smooth surface so that the mercury having a low coefficient of viscosity can be quickly moved along the flow surface 102a with practically no resistance due to drift and viscosity and thus the working speed of the mercury switch 1A is made sufficiently high. For instance, the working speed is set so that in case of a collision the time required for the mercury 102 to reach the electrode 105 is 10 ms.

Next, the mercury switch 1B will be described, in which numeral 109 designates mercury, 110 a container made from a metallic material, e.g., steel plate, 112 a cylindrical electrode made for example from ironnickel alloy, 113 a sealing member composed of glass for hermetically sealing the mercury 109. A projecting end 112a of the electrode 112 extends to the outside of the sealing member 113 and is connected to the other end of the lead wire 108. The projecting end 112a of the electrode 112 is also connected to an external connection terminal 115 through a lead wire 114. On the other hand, the metallic container 103 normally in contact with the mercury 102 and the metallic container 110 normally in contact with the mercury 109 are interconnected by a lead wire 116, and the metallic container 110 is connected to an external connection terminal 118 through a lead wire 117. Consequently, the two mercury switches or acceleration/deceleration detectors 1A and 1B are connected in parallel across the connection terminals 115 and 118. The connection terminals 115 and 118 are electrically insulated from each other and supported in an insulating resin projection 119 which is integral with an insulating resin base 120. The insulating resin base 120 supports the metallic containers 103 and 110 and the cylinders 104 and 111 as an integral unit. The insulating resin base 120 is made for example from a heat resisting ABS resin material. In the mercury switch 1B, the electrode 112 and the mercury 109 are normally electrically disconnected from each other and thus the mercury switch 1B constitutes a normally open switch. In the mercury switch 1B, a gap $l$ between the electrode 112 and the mercury 109 is selected to be smaller than the previously mentioned gap L in the mercury switch 1A and the lower surface of the sealing member 113 and the mercury flow surface of the container 110 are included to form conical surfaces to increase the distance of movement of the mercury 109 so that the mercury switch 1B detects such a first predetermined value of a relatively small acceleration or deceleration as will be caused on quickly braking a vehicle, i.e., one which is on the order of 0.7 G. While on the other hand projections 110a act as disturbance acceleration or deceleration absorbing means and are formed on the mercury flow surface of the container 110 to provide an increased frictional resistance to the movement of the mercury 109. By controlling random movements of the mercury 109 to same degree, the working speed of the mercury switch 1B is reduced to such an extent that it remains insensitive to intermittent accelerations and decelerations which may be caused by irregularities on a road surface on which a vehicle runs. To give an example, the working speed of the mercury switch 1B should preferably be selected so that on quick braking of a vehicle the electrode 112 comes into contact with the mercury 109 within 60 ms.

With the construction described above, the operation of the first embodiment is as follows. Under the normal driving conditions of a vehicle, the normally open mercury switches 1A and 1B in the acceleration/deceleration detecting means 1 are both open and hence a base current is supplied to the transistor 41 of the switching circuit 4 through the resistor 42. Consequently, the locking solenoid 21 of the seat belt locking mechanism 2 is energized through the collector and emitter of the transistor 41 and it continues to attract the core 22. As a result, in the seat belt locking mechanism 2 the ratchet plate 23 is in the position shown in FIG. 2 and the end edges 23c of the ratchet plate 23 are out of engagement with the ratchet wheel 25, thus permitting the seat belt 26 to be freely pulled out.

Next, the operation of the system upon occurrence of a large acceleration or deceleration exceeding the second predetermined value as in the case of a collision will be described. In such a case, an acceleration or deceleration occurs which is much greater than the second predetermined value of 2.5 G or the predetermined detection value of the mercury switch 1A and which tends to operate both of the mercury switches 1A and 1B. In this case, since the working speed of the mercury switch 1A is higher than that of the mercury switch 1B, the mercury switch 1A quickly operates first. In other words, since the mercury switch 1A is constructed so that it has a higher predetermined detection value and a sufficiently high working speed, the mercury switch 1A quickly comes into operation in case of a collision. This operation of the mercury switch 1A is effected when the mercury 102 is deformed as shown by the dotted line in FIG. 5 and establishes an electrical circuit between the electrode 105 and the mercury 102. The energization of the mercury switch 1A short-circuits the transistor 41 of the switching circuit 4 between the base and emitter thereof and the transistor 41 is cut off. Consequently, the locking solenoid 21 of the seat belt locking mechanism 2 is deenergized and the core 22 is returned in the direction of the arrow A in FIG. 2 by the spring force of the return spring 27. When this occurs, the ratchet plate 23 is rotated about its intermediate portion 23b and the end edges 23c are moved in the direction of the arrow B into engagement with the teeth of the ratchet wheel 25. As a result, the counterclockwise rotation of the ratchet wheel 25 is prevented and the seat belt 26 is locked to secure the position of the vehicle occupant and protect him. This locking operation of the seat belt 26 on collision is effected by the mercury switch 1A which operates at the high working speed, and the occupant is positively protected.

Next, the operation of the system in a case where a relatively small acceleration or deceleration exceeding the first predetermined value occurs as in the case of quick braking will be described. In such a case, no acceleration or deceleration occurs which is greater than 2.5 G (the second predetermined value) or the predetermined detection value of the mercury switch or acceleration/deceleration detector 1A and thus the mercury switch 1A does not operate. However, since the predetermined detection value of the mercury switch or acceleration/deceleration detector 1B is low (e.g., the first predetermined value of 0.7 G), the mercury switch 1B comes into operation upon quick braking of the vehicle, so that the mercury 109 is deformed as shown by the dotted line in FIG. 5 and establishes an electric circuit between the electrode 112 and the mercury 109. This short-circuits the transistor 41 of the switching circuit 4 between the base and emitter thereof and the transistor 41 is cut off. Consequently, the locking solenoid 21 of the seat belt locking mechanism 2 is deenergized so that in the similar manner as in the case of a collision, the seat belt 26 is locked to protect the occupant. While the working speed of the mercury switch 1B adapted to operate on quick braking is slightly lower than that of the mercury switch 1A, the seat belt locking operation required on quick braking needs not be so quick and therefore this gives rise to no operating difficulty.

Next, how the mercury switches or acceleration/deceleration detectors 1A and 1B can remain inoperative against accelerations and decelerations of a vehicle running on a rough road surface will be described. While the magnitude of accelerations and decelerations of a vehicle running on a rough road varies depending on the road surface conditions and vehicle speeds, it is for the most part smaller than 1.5 G. Therefore, although the working speed of the mercury switch 1A is selected high (in other words, it is so constructed that it is more liable to be operated by disturbances), the gap L between the mercury 102 and the electrode 105 is selected large and its predetermined detection value is selected greater than the previously mentioned magnitude of 1.5 G, whereby to render it inoperative against accelerations and decelerations due to rough road surfaces. On the other hand, since the predetermined detection value of the mercury switch 1B is selected 0.7 G, there are instances where it tends to be operated by accelerations and decelerations due to rough road surfaces. In fact, however, since the distance between the mercury surface and the electrode 112 is relatively large so that the working speed of the mercury switch 1B is made relatively slow, and since the random movement of the mercury 109 is controlled to some degree by the checking projection 110a which serves as an absorbing means, the mercury 109 is prevented from reaching the electrode 112 in response to an intermittent acceleration or deceleration due to the rough road surface, and consequently the mercury switch 1B does not operate. Thus, both the mercury switches 1A and 1B remain inoperative against such accelerations and decelerations due to rough road surfaces, and the seat belt locking mechanism 2 is prevented from repeating its locking operation undesirably while the vehicle is running on the rough road surface.

FIG. 6 illustrates another embodiment of the present invention which is identical with the embodiment of FIG. 4 except that in the switching circuit 4 the diode 43 is replaced with a capacitor 44 to absorb the counter electromotive force induced in the locking solenoid 21.

FIG. 7 illustrates still another embodiment of the present invention which is identical with the embodiment of FIG. 4 except that the switching circuit 4 comprises a PNP transistor 41'.

It will thus be seen that the switching circuit 4 may be embodied in various forms.

FIG. 8 illustrates still another embodiment of this invention, in which numeral 201 designates a normally closed mercury switch constituting a normally closed acceleration/deceleration detector which detects only such a large acceleration or deceleration of a vehicle as will occur in a collision and which opens when such an acceleration or deceleration reaches a second predetermined value, but normally remains closed. Numeral 202 designates a normally open mercury switch constituting a normally open acceleration/deceleration detector which detects a quick braking, quick turning or the like of a vehicle and which opens when the acceleration or deceleration of the vehicles reaches a first predetermined value which is lower than the second predetermined value, but it normally remains open. Numeral 41 designates a switching means, i.e., a transistor, 42 a base resistor, 44 a protective capacitor.

The construction of the normally closed mercury switch 201 and the normally open mercury switch 202 will be described in greater detail with reference to the sectional views of FIGS. 9 and 10. Referring first to FIG. 9 showing the normally closed mercury switch 201, numeral 211 designates mercury, 212 a metallic container made for example from steel plate and connected to an electrode 212a, 213 a cylindrical member made from steel, 214 an electrode made for example from an iron-nickel alloy and normally electrically conductively connected to the container 212 through the mercury 211 to constitute, along with the electrode 212a, a normally closed switch. Numeral 215 designates an electrode supporting insulator for electrically insulating the electrode 214 from the cylindrical member 213, 216 a cover insulator enclosing the container 212 to electrically insulate it. Thus, the mercury switch 201 detects only such a large acceleration or deceleration of a vehicle as will occur in a collision or the like, e.g., one which is greater than 2.5 G corresponding to a second predetermined value. Further, in the mercury switch 201, a flow surface 213a for the mercury 211 is made into a flat and smooth surface so that the mercury 211 may move quickly along the flow surface 213a with practically no resistance due to drift and viscosity of the mercury 211, and thus it has a sufficiently high response speed. In this way, when, for example, an acceleration or deceleration occurs which reaches the second predetermined value greater than 2.5 G as in a collision, the mercury 211 can separate from the electrode 214 within a short period of 10 ms.

Referring now to FIG. 10 showing the normally open mercury switch or acceleration/deceleration detector 202, numeral 241 designates mercury, 242 a metallic container made for example from steel plate and connected to an electrode 242a, 243 a cylindrical member made from steel. Numeral 244 designates a cylindrical electrode made for example from an iron-nickel alloy and positioned opposite to the surface of the mercury 241 with a certain intervening gap therebetween. The cylindrical electrode 244 is electrically disconnected with the container 242 and it constitutes, along with the electrode 242a, a normally open switch. Numeral 245 designates a sealing member, i.e., a glass for hermetically sealing the member 241, 246 a cover insulator for enclosing the container 242 to electrically insulate it. Thus, the mercury switch 202 detects such a relatively small acceleration or deceleration of a vehicle as will occur on quick braking or quick turning, that is, an acceleration or deceleration on the order of 0.7 G corresponding to a first predetermined value. Further, in the normally open mercury switch 202 the lower surface of the sealing member 245 and the mercury flow surface of the container 242 are formed into a conical shape to increase the distance of movement of the mercury 241, and moreover checking projections 242b as disturbance acceleration or deceleration absorbing means are provided on the mercury flow surface of the container 242. By providing the projections 242b in the manner just described and controlling the random movement of the mercury 241 to some degree, the response time of the mercury switch 202 is decreased to such an extent that it is rendered insensitive to a transient, intermittent acceleration or deceleration of a vehicle caused by irregularities on a road surface on which it is running. For example, this response time is selected so that when the vehicle has an acceleration or deceleration as great as the first predetermined value of 0.7 G as in the case of quick braking, the mercury 241 comes into contact with the electrode 244 within a time period of 60 ms.

With the construction described above, the embodiment of FIG. 8 operates as follows. Under normal driving conditions of the vehicle, the normally closed mercury switch 201 is closed and the normally open mercury switch 202 is open, so that a base current flows to the transistor 41 through the base resistor 42 and renders it conductive. As a result, the solenoid 21 of the seat belt locking mechanism 2 is energized through the collector and emitter of the transistor 41 and the normally open mercury switch 201 to continuously attract the core 22 (FIGS. 2 and 3). In this condition, the ratchet plate 23 of the locking mechanism 2 is in the position shown in FIG. 2 and the upper ends 23c of the ratchet plate 23 are out of engagement with the ratchet wheel 25, thereby permitting the seat belt 26 to be freely pulled out.

Next, the operation of the system when the vehicle has a large acceleration or deceleration as in a collision will be described. In such a case, the vehicle has an acceleration or deceleration much greater than 2.5 G or the second predetermined value of the normally closed mercury switch or acceleration/deceleration detector 201, and therefore both of the mercury switches 201 and 202 tend to operate. In fact, however, the normally closed mercury switch 201 quickly comes into operation earlier than the operation of the normally open mercury switch or acceleration/deceleration detector 202, since the response time of the latter is slower than the former. In other words, since the normally closed mercury switch 201 is constructed so that it has a high predetermined detection value and a sufficiently high response time, the normally closed mercury switch 201 quickly comes into operation in case of a collision. In other words, the mercury 211 is deformed to separate from the electrode 214 and the electrodes 214 and 212a are electrically disconnected from each other to open a circuit therebetween. When the normally closed mercury switch 201 opens, the supply of power to the locking mechanism 2 shown in FIGS. 2 and 3 is cut off and the solenoid 21 of the locking mechanism 2 is deenergized irrespective of the conduction or nonconduction of the transistor 41, causing the core 22 to return by the spring force of the return spring 27. Consequently, the ratchet plate 23 is rotated about the intermediate portion 23b and the upper ends 23c are moved in the direction of the arrow B (FIGS. 2 and 3) into engagement with the teeth of the ratchet wheel 25. When this occurs, the counterclockwise rotation of the ratchet wheel 25 is prevented and the seat belt 26 is locked to secure the position of the occupant and protect him. This locking operation of the seat belt 26 on collision is quickly effected by the normally closed mercury switch 201 operating at the high response speed, and the occupant is positively protected.

On the other hand, when the vehicle has a relatively small acceleration or deceleration as in the case of quick braking, quick turning or the like, the embodiment of FIG. 8 operates as follows. In this case, since no acceleration or deceleration occurs which is greater than 2.5 G or the second predetermined value of the normally closed mercury switch 201, the normally closed mercury switch 202 remains closed. On the other hand, the normally open mercury switch 202 comes into operation, since its first predetermined value is low (e.g., 0.7 G). Consequently, the transistor 41 is short-circuited between the base and emitter thereof and it is switched to the off condition with the result that the solenoid 21 of the locking mechanism 2 (FIGS. 2 and 3) is deenergized and the core 22 is returned by the spring force of the return spring 27. Consequently, the ratchet plate 23 is rotated about its intermediate 23b and the upper ends 23c are moved in the direction of the arrow B (FIGS. 2 and 3) into engagement with the teeth of the ratchet wheel 25. This prevents the counterclockwise rotation of the ratchet wheel 25 and the seat belt 26 is locked to secure the position of the occupant and protect him. In this case, while the response speed of the normally open mercury switch 202 adapted to operate for example on quick braking or quick turning is selected slightly lower than that of the normally closed mercury switch 201, the seat belt locking operation on quick braking or quick turning needs not be effected as quickly as in the case of a collision and there is thus no operating difficulty.

Next, how both the mercury switches 201 and 202 remain inoperative against the accelerations and decelerations of a vehicle running on a rough road surface will be described. In other words, while the accelerations and decelerations of a vehicle running on a rough road surface vary in accordance with the road surface conditions and vehicle speeds, the predetermined detection value of the normally closed mercury switch 201 is selected to be sufficiently high so that it remains inoperable against such accelerations and decelerations of the vehicle running on the rough road surface. On the other hand, since the predetermined detection value of the normally open mercury switch 202 is 0.7 G, there may be instances where it tends to operate in response to the accelerations and decelerations of the vehicle running on the rough road surface. In fact, however, the normally open mercury switch 202 has an increased distance of the flow of the mercury 241 and its response speed is also selected low. Thus, such transient, intermittent acceleration or deceleration of the vehicle running on the rough road surface cannot cause the mercury 241 to reach the electrode 244 and consequently the normally open mercury switch 202 does not operate. Thus both the mercury switches 201 and 202 remain inoperative against the accelerations and decelerations of the vehicle running on the rough road surface and there is no danger of the locking mechanism 2 repeating undesired locking operations while the vehicle is running on the rough road surface.

FIG. 11 illustrates still another embodiment of the present invention. This embodiment differs from the previously described embodiments in that a flywheel diode 43 is connected in parallel with the solenoid 21 of the locking mechanism 2 to replace the protective capacitor 44 in the embodiment of FIG. 8, and the normally open acceleration/deceleration detector comprises a normally open mercury switch 202' of ordinary construction in place of the normally open mercury switch 202 used in the embodiment of FIG. 5 so as to prevent the occurrence of undesired locking operations due to the running on a rough road surface. The embodiment of FIG. 11 further includes noise absorbing means consisting of a low-pass filter. Namely, numeral 49a designates a reverse current blocking diode, 49b a noise absorbing capacitor constituting the low-pass filter of the noise absorbing means, 49c and 49d shift levelling diodes. With this construction, no transient, intermittent closing of the normally open mercury switch 202' due to the running of a vehicle on a rough road surface causes the switching means, i.e., the transistor 41 to become nonconductive, since the transistor 41 is held in the conductive state owing to the action of the noise absorbing capacitor 49b. Consequently, the locking mechanism 2 does not operate. In this case, the noise absorbing capacitor 49b may of course be connected between the base and collector of the transistor 41. Further, the provision of the noise absorbing means makes it possible to use, in addition to the normally open mercury switch 202' of ordinary construction, many other types of acceleration/deceleration detecting means without employing the mercury switch as the normally open acceleration/deceleration detector.

What we claim is:

1. An automatic seat belt locking system for a vehicle comprising:
 first and second detectors for detecting an acceleration or deceleration of a vehicle whereby a first detection signal is generated by said first detector when said acceleration or deceleration is greater than a first predetermined value, and a second detection signal is generated by said second detector when said acceleration or deceleration is greater than a second predetermined value which is greater than said first predetermined value;
 a switching circuit connected to said first and second detectors and being turned off when at least one of said first and second detector signals is received;

and
a locking mechanism connected to said switching circuit for locking and preventing the movement of a seat belt securing a vehicle occupant when said switching circuit is turned off wherein said first detector includes absorbing means wherein a transient, intermittent, disturbance acceleration or deceleration greater than said first predetermined value is absorbed and said first detector is rendered insensitive to said disturbance acceleration or deceleration in accordance with said first predetermined value to thereby prevent the generation of said first detection signal.

2. A system according to claim 1, wherein the flow of current to said locking mechanism is cut off by the turning off of said switching circuit to lock and prevent the movement of said seat belt.

3. A system according to claim 2, wherein said first and second detectors comprise normally opened switches connected in parallel with each other.

4. A system according to claim 1, wherein said first and second detectors comprise normally opened switches connected in parallel with each other.

5. An automatic seat belt locking system for a vehicle comprising:
a normally open acceleration/deceleration detector adapted to close when an acceleration or deceleration of a vehicle is greater than a first predetermined value;
absorbing means provided in said normally open acceleration/deceleration detector whereby a transient, intermittent, disturbance acceleration or deceleration greater than said first predetermined value is absorbed to render said normally open acceleration detector insensitive to said disturbance acceleration or deceleration to thereby prevent the closing of said normally open acceleration/deceleration detector;
switching means adapted to be switched to a nonconductive condition in response to the closing of said normally open acceleration/deceleration detector;
a locking mechanism adapted to be deenergized by the switching of said switching means to said nonconductive condition to lock and prevent the movement of a seat belt securing a vehicle occupant; and
a normally closed acceleration/deceleration detector adapted to open and interrupt the flow of current to said locking mechanism when said acceleration or deceleration is greater than a second predetermined value which is larger than said first predetermined value.

6. An automatic seat belt locking system for a vehicle comprising:
a normally open acceleration/deceleration detector adapted to close when an acceleration or deceleration of a vehicle is greater than a first predetermined value;
an absorbing means connected to said normally open acceleration/deceleration detector wherein when a transient intermittent disturbance acceleration or deceleration causes a transient, intermittent closing of said normally open acceleration/deceleration detector, a transient, intermittent output signal of said normally open acceleration/deceleration detector is absorbed;
switching means connected to said absorbing means adapted to be switched to a non-conductive condition when a closing signal of said normally open acceleration/deceleration detector generated by the closing thereof passes through said absorbing means and is conducted to said switching means;
a locking mechanism connected to said switching means and adapted to be energized to lock and prevent the movement of a seat belt securing a vehicle occupant; and
a normally closed acceleration/deceleration detector connected to said locking mechanism and adapted to open and interrupt the flow of current to said locking mechanism when said acceleration or deceleration is greater than a second predetermined value which is greater than said first predetermined value.

7. The automatic seat belt locking system of claim 6 wherein said absorbing means comprises a low pass filter.

* * * * *